(12) United States Patent
Langan et al.

(10) Patent No.: US 6,766,064 B1
(45) Date of Patent: Jul. 20, 2004

(54) METHOD AND APPARATUS FOR PERFORMING A CONTRAST BASED DYNAMIC RANGE MANAGEMENT ALGORITHM

(75) Inventors: David Allen Langan, Clifton Park, NY (US); Michael Robert Hopple, Schenectady, NY (US); Robert Leland Nevin, Schenectady, NY (US); Jean Lienard, Clamart (FR)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/522,384

(22) Filed: Mar. 10, 2000

(51) Int. Cl.[7] .............................. G06K 9/00; G06K 9/40
(52) U.S. Cl. ...................... 382/274; 382/132; 382/131
(58) Field of Search ................................ 382/274, 272, 382/275, 266, 268, 260, 261, 232, 128, 132, 131, 282; 378/62, 98.7, 98.11, 98.12

(56) References Cited

U.S. PATENT DOCUMENTS

| | | | |
|---|---|---|---|
| 5,046,118 A | 9/1991 | Ajewole et al. | 382/271 |
| 5,450,502 A | 9/1995 | Eschbach et al. | 382/169 |
| 5,633,511 A | 5/1997 | Lee et al. | 382/132 |
| 6,546,124 B1 * | 4/2003 | Hopple et al. | 382/132 |

FOREIGN PATENT DOCUMENTS

| | | |
|---|---|---|
| EP | 505200 A2 | 3/1992 |
| EP | 544328 A2 | 11/1992 |
| EP | 0780791 A | 12/1996 |

OTHER PUBLICATIONS

Jia–Guu Leu, "Image Contrast Enhancement Based On The Intensities Of Edge Pixels", CVGIP Graphical Models and Imag Processing, Academic Press, Duluth, MA, US, vol. 54, No. 6, Nov. 1, 1992 pp. 497–506.

"Two–Dimensional Singal and Image Processing", by J. S. Lim, Prentice Hall, Englewood Cliffs, NJ, (1990) pp. 465–468.

Copending U.S. Patent Application Ser. No. 09/426,125, filed Oct. 25, 1999, by M. R. Hopple et al., entitled "A Method and Apparatus for Performing An Adaptive Extended Dynamic Range Algorithm".

* cited by examiner

*Primary Examiner*—Leo Boudreau
*Assistant Examiner*—Duy M. Dang
(74) *Attorney, Agent, or Firm*—Jean K. Testa; Patrick K. Patnode

(57) ABSTRACT

A method and apparatus are provided for performing a contrast-based dynamic range management (C-DRM) algorithm. The apparatus comprises an C-DRM processor that performs the C-DRM algorithm of the invention in order to compress an image input to the C-DRM processor down to a desired gray scale range for observation on a display. The C-DRM processor decouples adjustment of image mean values (low frequency) and image contrast values (high frequency), and manages mean and contrast separately. The use of separate mean and contrast modification functions improve on other known compression techniques by providing a more deterministic behavior and reduced complexity, allowing, for example, independent management of negative and positive contrasts. The C-DRM processor can also automatically adapt to the dynamic range of an input image so that the input image thereby applying the minimal compression needed to display the image.

38 Claims, 7 Drawing Sheets

METHOD AND APPARATUS FOR PERFORMING A CONTRAST BASED DYNAMIC RANGE MANAGEMENT ALGORITHM

BACKGROUND OF THE INVENTION

The present invention relates to a method, a memory medium and an apparatus implementing and performing a contrast-based dynamic range management ("C-DRM") algorithm, for compressing an intensity dynamic range of an input image to a reduced intensity dynamic range supported by an available display device and, moreover, for doing so in a fashion which maximizes the displayed image contrast and detail. The compression is performed, in accordance with the invention, by directly and separately managing the mean (low frequency) and contrast (high frequency) content of the input image. This affords more deterministic behavior and reduced complexity, while enabling automatic adaptation to the dynamic range of the image, and results in minimizing the extent of compression required to enable displaying the image with optimized contrast on an available display device. The invention more particularly relates to such a method, a memory medium and an apparatus applicable to cardiac x-ray imaging and accordingly operable at video rates (typically 30 frames per second) and having low latency (i.e., a time duration from image acquisition to display of around 150 ms and thus effectively producing a real time display) to enable eye-hand coordination and which does not require interactive tuning of performance by a physician, permitting the physician to concentrate on performing an on-going medical procedure in reliance upon the displayed images, e.g., guiding a catheter through a blood vessel of a patient, without being distracted by any requirement for interactive tuning of the image acquisition, processing and display apparatus.

Digital X-ray imaging is a well-known, non-contact technique for observing, in real time, interior aspects of an object. In practice, an X-ray beam is generated and targeted on the object of interest. A detecting device is positioned on the other side of the object and detects the X-rays transmitted through the object. The detected X-ray signals are converted to digital signals that represent various features in the object, are further processed, and the resulting signal is displayed on a display device such as a CRT.

One of the fundamental image processing problems in digital X-ray imaging is the need to transform the intensity dynamic range of the input image to the dynamic range supported by an available display device. Typically, the intensity dynamic range of an image exceeds the dynamic range of the display mechanism by several times. The objective of the transformation accordingly is to compress the "DC" or mean component of the different regions comprising the image so that the dynamic range (typically 256 gray levels) of an available display device may be utilized in a fashion which maximizes the displayed image contrast—taking into account, as well, the generally recognized limitation of the human eye of discerning only 256 gray levels.

Common approaches to achieving such transformations are known as "unsharp masking" and "extended dynamic range (EDR)", the latter a special adaptation of the former. The conventional approach to performing the EDR algorithm, in general, is simply to subtract a portion of the mean from the input signal. However, in some situations, this approach results in important contrast (higher frequency) information either being removed from the image or being artificially enhanced and thereby introducing artifacts. In certain improved implementations of the EDR algorithm, however, compression is less likely to result in a loss of higher frequency contrast information or an introduction of artifacts.

A more recent type of EDR function, employed in a cardiac feasibility study relating to a predecessor system relative to the present invention, is computed and implemented in the following manner:

$$y(i,j) = \text{GAMMA}[x(i,j) - \text{BOOST}[\bar{x}(i,j)]], \quad (1)$$

where:

$y(i,j)$ is the $(i,j)^{th}$ pixel value of the output image;

$x(i,j)$ is the $(i,j)^{th}$ pixel value of the input image; and $\bar{x}(i, j)$, i.e., (x_bar(i,j)), is the local spatial mean intensity value of the $(i,j)^{th}$ pixel, derived from a BOXCAR average. (In practice, intensity is directly related to X-ray count, but the relationship is rather complex. The x-rays are converted to photons which, in turn, are converted the electrons, in an x-ray imager. The Electrons are then digitized by an analog-to-digital converter ("A/D" or "ADC") and basic image corrections are performed, such as adjustments to gain, offset and scaling, after which the image is ready to be processed for display.)

A graphical representation of the EDR processing is shown in FIG. 1. The intensity value x of an input pixel (i,j) of an image is first processed by a BOXCAR (moving average) function 12 that determines the local mean intensity value at that (i,j) pixel location. (An "x" is used herein to designate an input intensity at a pixel location and, thus constitutes an individual scaler value; by contrast, an "X" designates the intensity image value, and thus is a vector value.) The BOXCAR function 12 utilizes a neighborhood of pixels, which includes and is centered on the input pixel, to calculate the local spatial mean intensity value $\bar{x}(i,j)$—(see, terms of Equation (1), supra).

As illustrated in FIG. 1, BOOST LUT 14 comprises a look-up table (LUT) which specifies the intensity reduction of the input image signal x(i,j) as a function of the local spatial mean intensity value $\bar{x}(i,j)$. An adder (ADD) 18 combines the (negative) output of BOOST LUT 14 and the (positive) output of LUT 16 (see Equation (1)) and supplies the result to GAMMA LUT 20, which then compresses the result of the unsharp masking, or subtraction, operation of an ADD 18 to 256 levels (8 bits per pixel, or 8 bpp). The LUTs 14 and 20 are indexed by the appropriate pixel intensity values given in equation (1). Thus, each of the BOOST LUT 14 and the GAMMA LUT 20 jointly manages both mean and contrast modification functions. Thus, this more current EDR processing algorithm, while an improvement over previous compression/transformation algorithms (e.g., which merely subtracted the local mean intensity signal from the input signal), is relatively complex, yet does not permit simultaneous, independent control of the mean and contrast modification functions.

Another problem with the current EDR processing algorithm is that of inconsistent contrast management resulting in exaggeration of negative contrast regions in the image. When a region in the image, such as a vessel filled with dye, for example, has an image intensity which is less than the surrounding local mean intensity value, EDR processing may exaggerate the negative contrast associated with the darker region when it subtracts the local mean intensity values from the intensity values associated with the darker region. This exaggerated negative contrast may result in artifacts, which can lead to misdiagnosis.

Where an image includes multiple areas having potentially differing mean levels of gray, or when images of objects embedded in such areas have respective, different gray levels, or if respective gray levels of an object and its background have similar values, the contrast parameters of the display window must be adjusted to enhance the visibility of these differences in order to obtain a diagnosis of the underlying structure being imaged. Thus, when a viewer's attention is shifted from one object to another, where the contrast of one combination of object and background differs significantly from the contrast of another combination of object and background, various display window parameters relating to contrast adjustment must be changed. Without such adjustments, the image will appear either excessively faint or excessively bright, such that all detail critical to an effective diagnosis is absent. As a result, in order to obtain a diagnosis, it is often necessary, during the course of shifting attention among areas of differing contrast, for the physician to make numerous contrast adjustments to the display window. This can be disruptive in, e.g., radiology and mammography procedures and is altogether unacceptable in cardiac procedures, underway at the time.

Contrast of a cardiac digital X-ray image must be managed in a deterministic and consistent manner to achieve optimum results. For example, cardiologists perform diagnoses by examining the apparent thickness of a coronary artery, as revealed in X-ray imaging by a contrast medium injection. Because of X-ray physics, the artery thickness may lead to a modulation of the underlying background gray-level, i.e., contrast. Contrast consistency, particularly in dye filled vessels, is important, since processing-induced contrast changes in vessels may be interpreted as coronary disease leading to misdiagnosis. Consequently, it is desirable that artery contrast (i.e., not intensity) pass through DRM processing with deterministic and linear gain. However, minimal and deterministic modification to contrast can be tolerated, particularly in X-ray imaging of the lungs, where there is significant compression of the mean and minimal clinically relevant information. In fluoroscopic mode, the cardiologist is focused on the placement of interventional devices, and the rendering of the corresponding contrast is more directed by the visibility of these tools. In prior systems, however, contrast functions were managed in a non-linear manner, which varied with the local mean—leading to artifacts and confusion and resulting, in at least some cases, in increased patient exposure in efforts to position the X-ray tube and an image intensifier such that a vasculature of interest, e.g., over a spine diagram, could be viewed satisfactorily.

Accordingly, it is desirable to provide a compression algorithm that overcomes the deficiencies of the aforementioned EDR processing algorithms and which permits managing the mean (low frequency) and contrast (high frequency) content of an image, separately and directly. Further, it is desirable to provide a compression algorithm that overcomes problems associated with inconsistent contrast management. Yet other limitations exist in even the more current EDR processing algorithm. For example, an X-ray imaging system is generally provided with controllable settings that allow the user to manually select one of three dynamic ranges. The EDR processor then subtracts a particular percentage of the local mean intensity value from the input image intensity value, based on the setting selected by the user. If the user fails to select the appropriate setting which best accommodates the dynamic range of a given image, the displayed image may have poor image quality. In many cases, this may result in the loss of more high frequency contrast information than is necessary to perform the compression.

It accordingly is desirable to provide a compression algorithm which adaptively adjusts to the dynamic range of the image, so that high frequency contrast information is preserved, while applying minimal compression to display the image in a more deterministic manner and with reduced complexity.

BRIEF SUMMARY OF THE INVENTION

The invention provides a method, a related memory medium and an apparatus for implementing and performing a contrast-based dynamic range management (C-DRM) algorithm, to compress input image data of a broad dynamic range of intensities to a reduced dynamic range (e.g., 256 levels) of an available display device, by managing the image's mean (low frequency) and contrast (high-frequency) content, separately and directly. A BOXCAR (moving average) device takes an intensity image, as input, and produces an output image in which the intensity of each pixel represents the local mean intensity of the input image. In a first processing path, a local mean estimate of the intensity of a pixel of the input image is processed by a mean modification function to produce a modified local mean intensity of the pixel. In a second path, independent of the first path, the intensity of the corresponding pixel is processed in relation to the local mean estimate thereof to produce a contrast estimate, the local mean estimate is processed with a contrast modification function to produce a result. The result then is combined with the contrast estimate to produce a modified contrast estimate which then is combined with the modified local mean to produce a modified output intensity for the corresponding pixel in the reduced intensity dynamic range. While a BOXCAR moving average is used in the disclosed embodiments herein, the specific method used for computing the local mean estimate is not essential to the C-DRM processing.

In a further embodiment, C-DRM is implemented so as to be adaptive and thereby to follow variations in image intensities while panning, but without causing flicker or delay modifications in the resulting display. In yet further embodiments, function modification of contrast and of mean is implemented by respective multiple look-up tables (LUTs), the specific table for each being selected, based on a maximum intensity value for the image as a whole. However, the use of multiple LUTs for adaptive range compression is not essential to the central concept herein of separately and directly managing mean and contrast components of the image data.

DETAILED DESCRIPTION OF THE INVENTION

Figure 2:
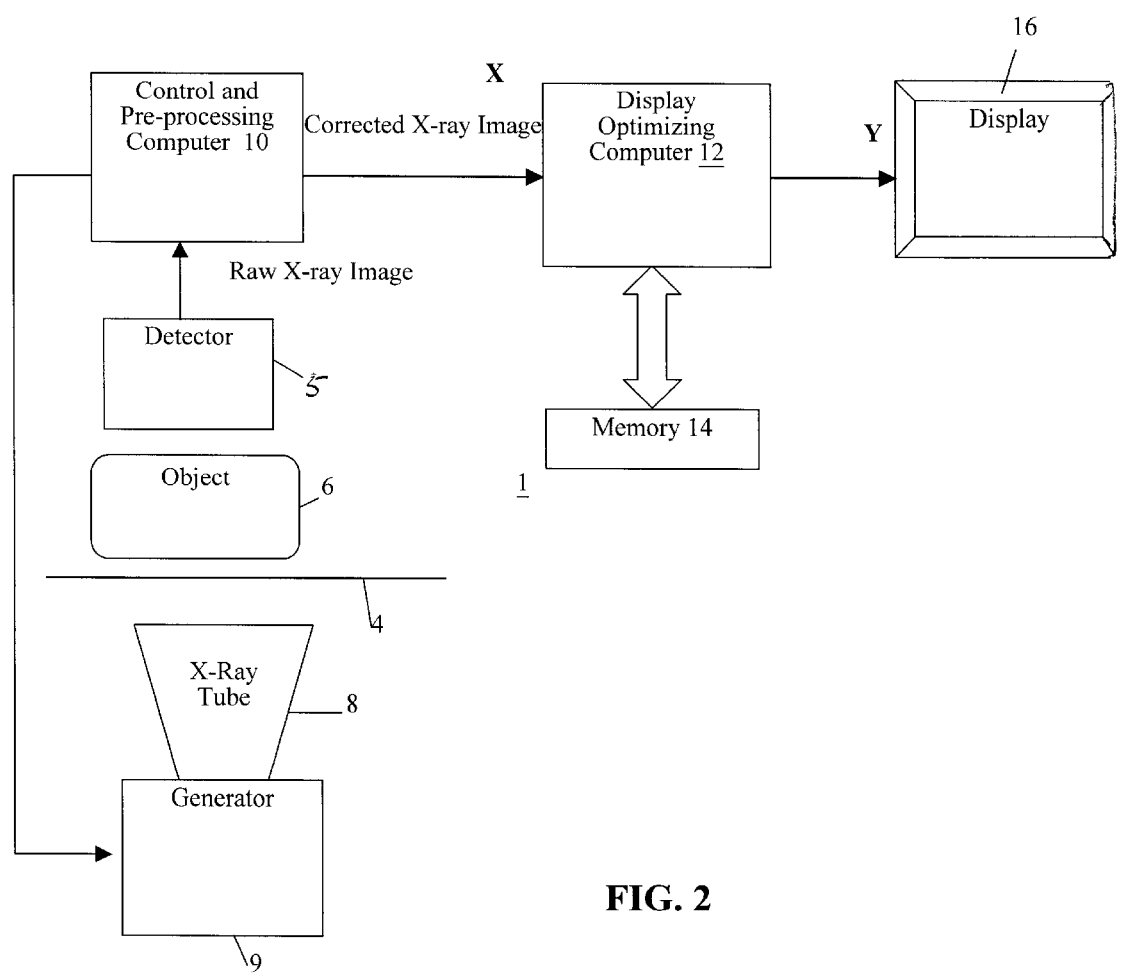
FIG. 2 is a schematic flow diagram of an X-ray imaging system implementing and performing a C-DRM algorithm in accordance with the invention.

FIG. 2 is a flow diagram of an x-ray imaging system 1 which may implement and perform the C-DRM processing algorithm of the invention. The system 1 comprises a table 4 on which an object 6 which is to be imaged (e.g., a human body) rests so as to be irradiated by X-rays emitted by an X-ray tube 8, driven by a generator 9 under exposure management control by a control and preprocessing computer 10. X-rays passing through the object 6 are attenuated in differing amounts depending upon the character of the body portions, and conditions therein, of the object 6 being imaged. Thus, the variously attenuated X-rays impinge upon and are detected by a digital detector 5, the image signal output of which is supplied to the control and preprocessing computer 10, all in conventional fashion. As is likewise conventional, the computer 10 controls various functions of the X-ray imaging process including, e.g., offset, gain, bad pixel correction, exposure management (e.g., as to the generator 9 and X-ray tube 8) and scaling operations and, further, preprocesses the received X-ray image data so as to produce a corrected X-ray image data output X.

A display optimizing computer 12 includes a memory 14 which stores the image data, X, output by computer 10, which is to be processed in accordance with the C-DRM algorithm of the invention by the computer 12 and, further, performs related display optimizing processing, such as spatial and temporal filtering, zoom, and display control functions, for producing an optimized output signal Y. Signal Y is supplied to, and displayed by, display unit 16. The imaging system 1 of FIG. 2 is adapted to perform C-DRM algorithm processing in accordance with the present invention and including each of the embodiments of FIGS. 3–8 and 10, as hereinafter discussed. As used herein, "adapted to" and the like refer to processing components (e.g., programmable digital processor, application specific integrated circuit (ASIC) and the like) programmed or arranged to process data to provide a desired-output.

A feasibility system, as shown in FIG. 2, was implemented using Datacube™ MAXPCI ASIC's whose operations were specified in software. The software was Imageflow™, a Datacube™ language, used to setup the ASIC's and related control and data flow paths.

Figure 1:
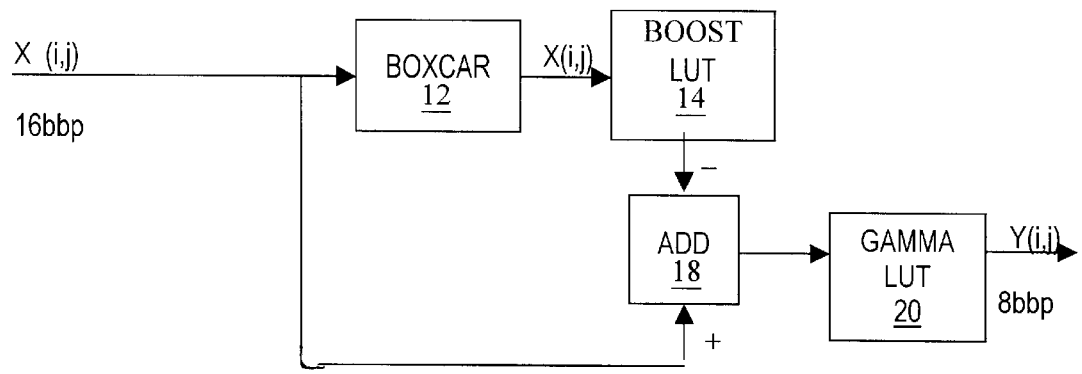
FIG. 1 is a flow diagram of an EDR algorithm processor of the prior art.

As seen in FIG. 1 (prior art) and as described above, conventional algorithms, collectively called "EDR", use GAMMA and BOOST in a "composite function" form: GAMMA(x(i,j)–BOOST(x_bar(i,j))). In other words, the value at which GAMMA is evaluated actually depends, itself, on the value of BOOST at x_bar. This composite function couples the effects of GAMMA and BOOST and makes the algorithm less "tractable," i.e., it is harder to isolate out, or extract, the individual effects of changes to GAMMA and BOOST.

The invention overcomes this problem by circumventing the composite function formulation that is a defining feature of the EDR algorithms. The two modification functions F_c and F_m are not composed with each other—i.e., the argument of each is only M_x, which comes from the BOXCAR. The values of F_c and F_m can be combined in the lookup tables ("LUT's") of each of the embodiments of FIGS. 3 to 7 without defeating the decoupling, because neither F_c nor F_m is evaluated at an argument that includes the other function.

As a result of this decoupling, each data attribute (i.e., as to each of contrast and mean) may be modified directly, instead of through a chain of nested functions. Each modification function also concerns only one attribute, either contrast or mean. The modification of the attributes is therefore performed separately of, instead of jointly with, the other. Note that in EDR, the only way to adjust contrast at x_i,j, for example, is to change both GAMMA and BOOST jointly—because y_i,j is defined by the composite (GAMMA( ) . . . +BOOST( ))

Figure 3:
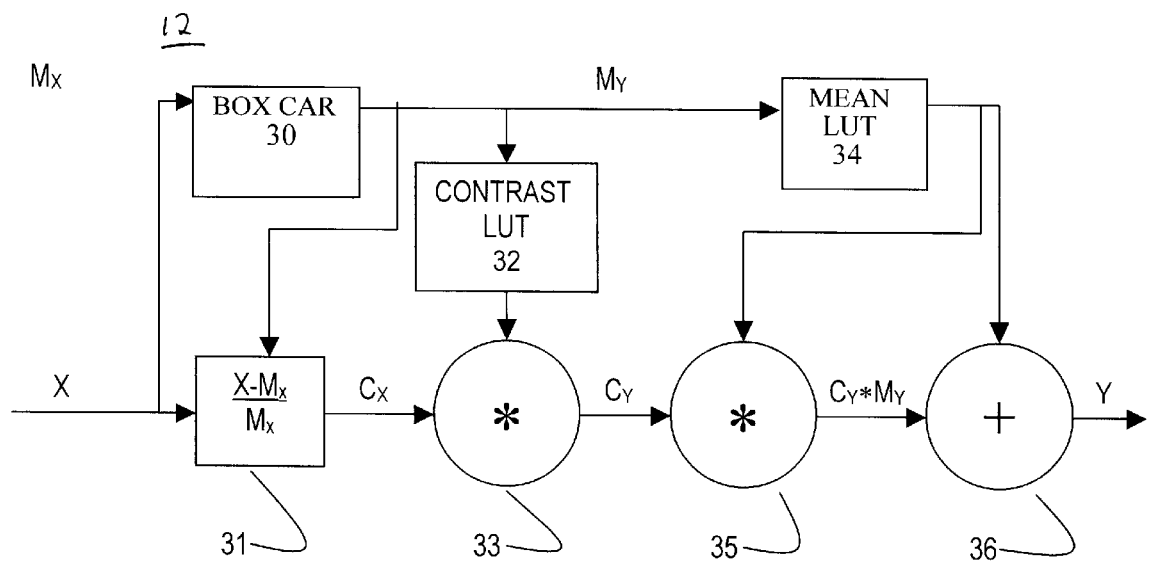
FIG. 3 is a flow diagram of an apparatus implementing and performing the C-DRM algorithm, in accordance with a first embodiment of the invention, for processing X-ray image signals and transforming a dynamic range thereof for display on an available display unit having a lesser dynamic display range.

FIG. 3 illustrates a block diagram of a C-DRM processor of the display optimizing computer 12 of FIG. 2, in accordance with a first embodiment of the invention. Each block of the C-DRM processor represents one or more functions, where:

X=input intensity $M_X$=local mean estimate $C_X$=contrast estimate $F_M(\ )$=mean modification function of $M_X$ $F_C(\ )$=contrast modification function $M_X$, and with respect to embodiments of FIGS. 6 through 8, of $M_X$, $S_{CX}$ Y=C-DRM output intensity $M_Y$=modified local mean $C_Y$=modified contrast The C-DRM processor computes for Y as follows:

$$Y = M_Y(1+C_Y), \text{ where:} \quad (2)$$

$$M_Y = F_M(M_X), \quad (3)$$

$$C_Y = F_C(M_X) * C_X, \text{ and} \quad (4)$$

$$C_X = (X-M_X)/M_X \quad (5)$$

As is apparent from equations (3) and (4), the modified local mean (My) and the modified contrast ($C_Y$) are separately and directly managed, respectively, in producing the C-DRM output intensity Y, in equation (2). F_m, the mean modification function, may achieve a linear or non-linear transformation of the mean component of the image. F_c, the contrast modification function, is restricted to applying a linear gain to the input contrast to construct the output contrast.

In accordance with the implementation of the first embodiment of the invention shown in FIG. 3, the input intensity value X of an input pixel in the image is first processed by the "BOXCAR" (or moving average) function 30 to produce the local mean estimate $M_X$. The specific method for computing the moving average is not essential to the C-DRM method. The BOXCAR function 30 utilizes a neighborhood of pixels, typically next-adjacent to and including the input pixel being processed, to calculate the local mean estimate $M_X$. The BOXCAR function 30 acts as a low pass filter for separating structures of interest from variations in the detection output which are less relevant, e.g., gradually varying background. In experimental implementations, a 32×32 BOXCAR resulted in ringing (that is, an intensity oscillation) along contrast field vessels contrast filled vessels, heart to lung transition, heart to diaphragm, contrast filled catheter, etc. A 64×64 BOXCAR avoids that deficiency by spanning a sufficient spatial area, or extent, such that contrast-liquid filled coronaries do not unduly influence the mean estimate of the background and sudden background changes, such as heart to lung, are more gradual; accordingly, a 64×64 BOXCAR is preferred.

The local mean $M_X$ is then inputted to arithmetic unit 31, which processes X in accordance with the equation (5) above, and outputs the contrast estimate $C_X$ to multiplier 33. Contrast LUT 32 processes $M_X$ in accordance with the contrast modification function $F_C(\ )$ of equation (4) above and supplies the contrast gain, the output $F_C(M_X)$ thereof, to multiplier 33 which performs the multiplication function of equation (4) and the produces the modified contrast $C_Y$ output.

The mean LUT function 34 processes the local mean estimate $M_X$ by the mean modification function $F_M(\ )$ of equation (3), above, to output the modified local mean $M_Y$. The mean modification function $F_M(\ )$ compresses the low frequency component of the input intensity X, directly and separately from (i.e., independently of) the contrast component. Adder 36 then performs the function equation (2), above, outputting the C-DRM output intensity Y to the display 11, thereby to reproduce the image thereon in the reduced intensity dynamic range supported by the display 11.

The following specifications were employed in an actual reduction to practice of the invention:

Mean Function Modification

DRM shall compress the background of the input image (in the range 0 to NxABD) into an 8 bits component (in the range of 0 to 255) by applying a monotonically increasing modification function $My=F_M(Mx)$ depending upon Mx only, defined by:

$F_M(0)=0$ $F_M(ABD)=100$ $F_M(NxABD)<255$

The monotonically increasing function $F_M$ means that $F_M(X+1) \geq F_M(X) \forall X$.

As an example of the mean modification function, Fm( ) transforms the mean from being linearly related to X-ray counts to being linearly related to an equivalent water thickness represented by the X-ray counts. This is achieved through the application of well known mathematical models of X-ray physics. The transformation from "intensity" to "thickness" is commonly constrained to map the assumed mean heart intensity, i.e., the automatic brightness detection "ABD" value, to a desired output mean, typically 100. The assumed input mean heart intensity is achieved through the conventional exposure management and rescaling functions of the X-ray system 1 of FIG. 2, and particularly the computer 10.

Contrast Function Modification

It is assumed here that the input image is in a linear encoded format.

The contrast modification function $C_Y=F_C(M_X)*C_X$ is implemented, preferably, so as to comply with the requirement that $F_C$ shall be monotonically increasing, which means that:

$$F_C(C+1, M_X) \geq F_C(C, Mx) \forall C, Mx. \quad (5A)$$

The contrast modification function Cy is a linear gain which is a function of $M_X$, as seen in the above equations (and accordingly is subject to variation along with variation in the mean). In practice, the gain is nominally unity in the heart and in other, relatively darker anatomical regions where clinically relevant information exists. The contrast gain must smoothly transition to values less than unity in the relatively bright lung region, to suppress the detail, which is not clinically relevant and may constitute a possible source of distraction, and to minimize clipping as the mean component of the resulting image approaches the maximum intensity of 255. In other words, the available contrast afforded by the maximum intensity of 255 must be carefully allocated to clinically relevant data.

Figure 4:
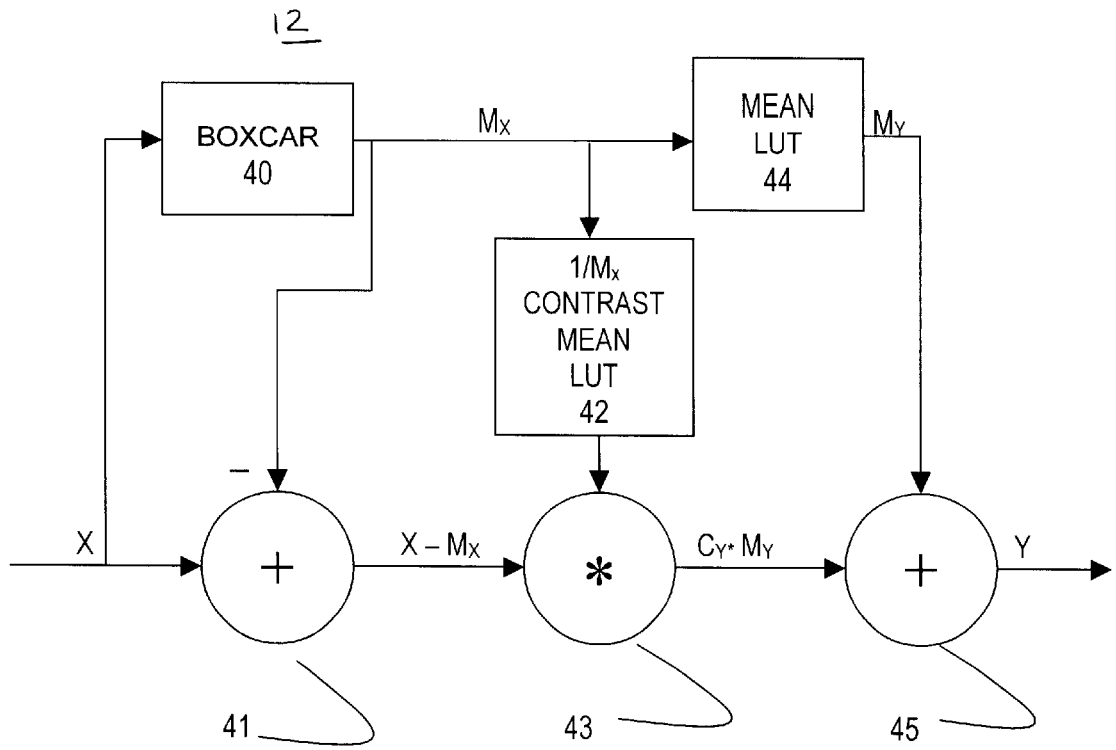
FIG. 4 is a flow diagram of an apparatus implementing and performing the C-DRM algorithm in accordance with a second embodiment of the invention.
Figure 5:
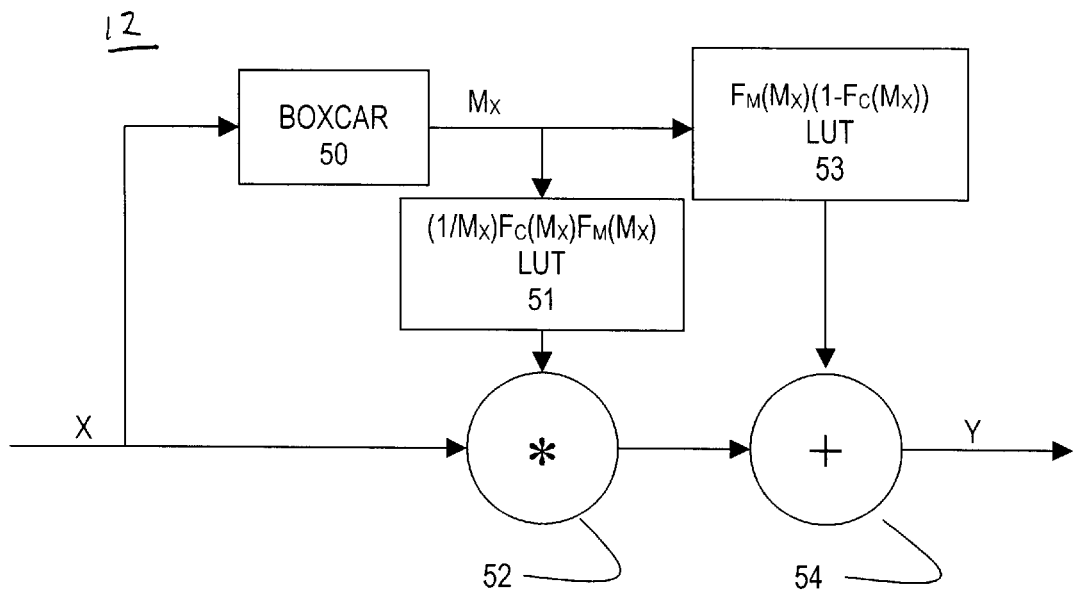
FIG. 5 is a flow diagram of an apparatus implementing and performing the C-DRM algorithm in accordance with a third embodiment of the invention.

The C-DRM data flow diagrams in FIG. 3 may be optimized for real-time processing in accordance with the further, alternative embodiments of FIGS. 4 and 5.

FIG. 4 illustrates a second embodiment of the invention, partially optimized for real-time processing relative to the embodiment of FIG. 3. Specifically, the FIG. 3 division function 31 and the multiply function 35 are performed within the LUT component 42 of FIG. 4, thereby reducing the FIG. 3 computation functions by one division function and one multiply function. In FIG. 4, input intensity X is processed by BOXCAR function 40, as in BOXCAR 30 of FIG. 3, and the resulting local mean estimate $M_X$ is then directed to adder 41 for subtractive combination with X, and which produces $X-M_X$ as an output. $M_X$ is also supplied to 1/M Contrast Mean LUT function 42, the output of which is supplied to multiplier 43 and the product output of which, $C_Y*M_Y$, representing a combined, modified contrast and mean result, is then directed to a second adder 45. $M_X$ furthermore is supplied to the mean LUT function 44 which outputs, as does mean LUT 36 in FIG. 3, the modified local mean $M_Y$. $M_Y$ is combined in adder 45 with the output of multiplier 43, above described, to produce the compressed C-DRM output intensity signal $Y=M_Y(1+C_Y)$.

A third embodiment of the invention, which is fully optimized for real-time implementation, is illustrated in FIG. 5. The computation of the invention is further simplified by eliminating the ADD 41 and unsigned (that is, without arithmetic sign) inputs to the MULTIPLY 43 of FIG. 4. BOXCAR 50, as with the BOXCARS 12, 30 and 40 of the prior embodiments, performs a moving average on the input intensity X to output the local mean estimate $M_X$, $M_X$ is supplied to LUT 51, where it subjected to the therein-designated modification function, and the resulting product then is directed to multiplier 52 for multiplication with X, the resulting product being supplied to adder 54. $M_X$ is also supplied to LUT 53, where it is processed by the modification function therein indicated i.e., the mean modification function is multiplied by the negative complement of the contrast modification function $(1-F_C(M_X))$ and the resultant output is supplied to adder 54, for additive combination with the output of multiplier 52, and adder 54 then outputs the compressed, C-DRM output intensity Y.

Due to the movement of computational elements of prior embodiments (e.g., FIGS. 3 and 4) into LUTs 51 and 53, the relationship of LUTs 51 and 53 to the contrast and mean modification functions is complex. Nevertheless, the processing functions of FIG. 5 will be readily understood from the following, which leads to the definition of the C-DRM output intensity Y:

$Y = CyMy + My$, where: (6)

$Cy = fcCx$ and $fc(Mx) = fc$ $Y = fcCxMy + My$, where: (7)

$$cx = \frac{x - Mx}{Mx}$$

$Y = fc(X - Mx)(My/Mx) + My$ (8)

$$Y = \frac{fcMy}{Mx}\left[x - Mx\left(1 - \frac{1}{fc}\right)\right]$$ (9)

$$Y = X\left(\frac{fxMy}{Mx}\right) - Mx\left(\frac{fcMy}{Mx}\right)\left(1 - \frac{1}{fc}\right)$$ (10)

$My = fm(Mx) = fm$ $$Y = X\left(\frac{fcfm}{Mx}\right) - Mx\left(\frac{fcfm}{Mx}\right)\left(1 - \frac{1}{fc}\right)$$ (11)

$$Y = X\left(\frac{fcfm}{Mx}\right) - Mx\left(\frac{fcfm}{Mx} - \frac{fcfm}{fcMx}\right)$$ (12)

$$Y = X\left(\frac{fcfm}{Mx}\right) - Fm(fc - 1)$$ (13)

$$Y = X\left(\frac{fcfm}{Mx}\right) + fm(1 - fc)$$ (14)

As can be seen from the succession of equations (6) through (14), the function modifications for contrast and mean are each handled directly and separately of the other, even though concurrently processed in two respective and different primary paths. All functions with the exception of multiplication 52 and addition 54 in this embodiment of FIG. 5 are implemented in the LUTs 51 and 53, optimizing the speed of processing and thus affording a real-time implementation.

The embodiments of the invention shown in FIGS. 3–5, when applied to digital cardiac images, were experimentally found, in common, to provide a clinically accurate but aesthetically suboptimal rendering of the lung field. Input positive contrasts (x>Mx) were at risk of being clipped to 255 unless a very small contrast gain was applied but, as a result thereof, "contouring" or "cartooning" resulted, which is also undesirable. Note that for negative contrasts (x<Mx), x is less than Mx, thereby bounding Cx between 0–100%. For positive contrasts (x>Mx), x may be many times greater than Mx; therefore, Cx is more loosely upper bounded. This positive contrast issue provides challenges in the lung portion of an image, where there is significant local variation in contrast. This challenge is addressed in accordance with the invention by managing positive and negative contrasts separately. In this way, negatively contrasted detail, such as contrast-fluid (e.g., iodine) filled vessels and inserted clinical devices (e.g., catheters) in bright areas, such as the lungs, may pass through C-DRM with strong gain and be readily visible to the clinician. Conversely, positive contrasts in brights areas preferably are suppressed, thereby avoiding aesthetically undesirable rendition of bright areas, such as lung fields.

Figure 6:
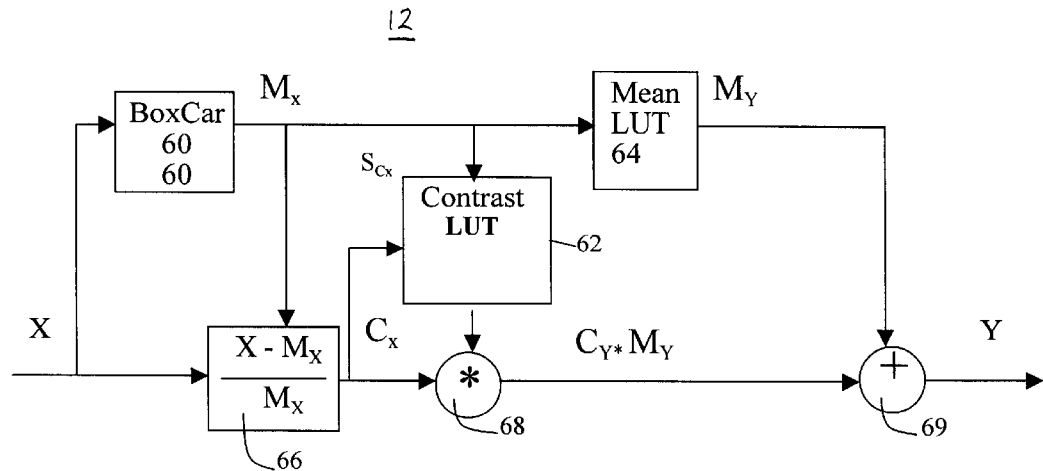
FIG. 6 is a flow diagram of an apparatus implementing and performing the C-DRM algorithm in accordance with a fourth embodiment of the invention.

As background relevant to the embodiment of FIG. 6, in cardiac X-ray imaging, the bright lung field is generally unimportant clinically, but nevertheless it is highly desired that it have a natural appearance. The contrast and mean of the lungs may be strongly compressed, ensuring the majority of the display dynamic range is allocated to anatomical areas of clinical interest but while maintaining a natural appearance. However, contrast-liquid filled coronaries and clinical devices may be imaged over the lungs as a result of the projection of certain imaging angulations. In this situation, the contrast of the clinically relevant information must be preserved and not compressed. To achieve the above objectives and in accordance with FIG. 6, the sign Scx of the contrast estimate Cx (Scx=X−Mx) is measured and Scx is used to manage positive and negative contrasts, separately achieving the dual objectives stated above.

More particularly, FIG. 6 depicts the fourth embodiment of the invention in which positive and negative contrasts are managed separately, by supplying the sign, $S_{CX}$, of the input contrast, or contrast estimate, as an input to the contrast modification LUT 62. The physical size of contrast LUT 62 is doubled, so as to accommodate the additional (sign) bit for the input address. The remainder of FIG. 6 corresponds to FIG. 3. The BOXCAR 60 performs a local mean estimate in the same manner as BOXCARS 12, 30, 40, and 50. With X and Mx as inputs, function 66 calculates the input contrast (i.e., contrast estimate) Cx in the same manner as function 31 of FIG. 3. Scx, the sign of Cx, and Mx are inputs to the contrast modification function Fc(Scx, Mx) LUT 62. Mx is modified to My via the mean modification LUT 64. My is then input to the MULTIPLY 65 and to the ADD 69. The ADD 69 produces the final output Y.

The embodiment of FIG. 6 may be computationally simplified for realization in the same manner as the first embodiment of FIG. 3 was simplified, in the successive second and third embodiments of FIGS. 4 and 5, respectively. The only difference is the need to provide Scx as an input to the contrast modification function Fc( ) of LUT 62 Equations (6)–(14) similarly apply.

Figure 7:
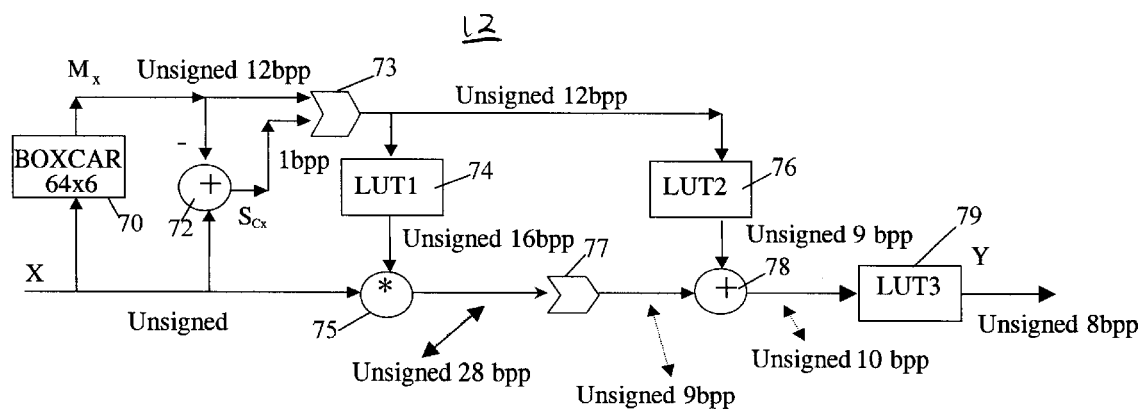
FIGS. 7 and 8 are flow diagrams of alternative fifth and sixth embodiments of apparatus implementing and performing the C-DRM algorithm.
Figure 8:
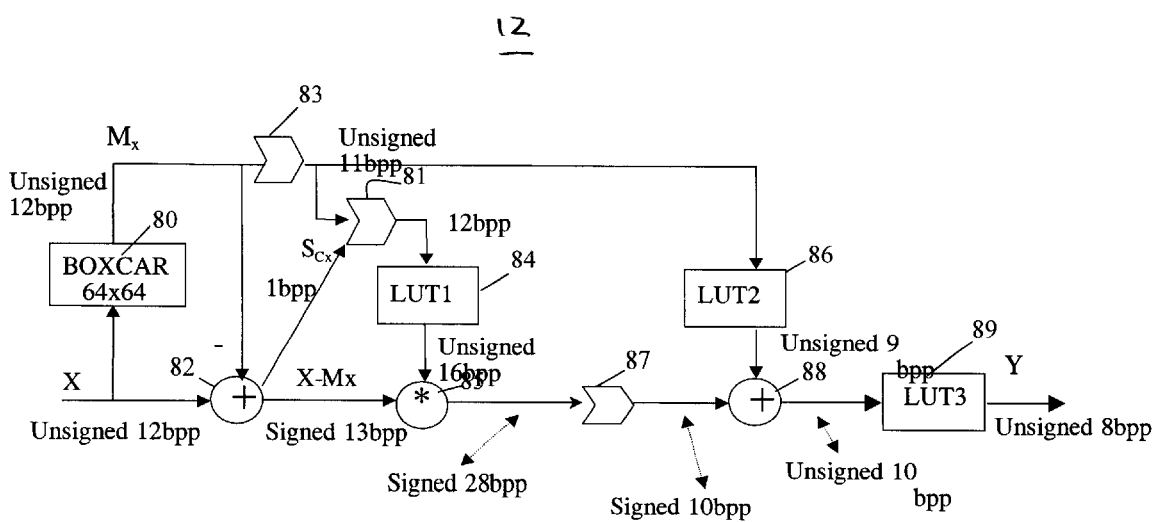

The fifth and sixth embodiments of the invention, FIGS. 7 and 8 respectively, comprise two alternative, computationally simplified embodiments of FIG. 6 and which parallel the relationship of FIGS. 4 and 5 to FIG. 3. FIGS. 7 and 8 tradeoff LUT size versus the need for signed multiplication components, or functions, and are detailed to the level required for implementation on dedicated hardware, such as an ASIC or a digital signal processor DSP.

The relationship of the fifth embodiment of the invention, of FIG. 7, to FIG. 6 parallels the relationship of FIG. 5 to FIG. 3.

FIG. 7 is labeled with bit size designations relevant to practical implementations of apparatus implementing and performing the C-DRM algorithm of the FIG. 7 flow diagram. Thus, image input X is designated "unsigned 12 bpp", i.e., an unsigned 12 bit per pixel input image signal. Similarly, bit depths of intermediate processing results are likewise labeled in bits per pixel ("bpp"). The BOXCAR 70 performs the same operation as performed by BOXCARS 12, 30, 40, 50, and 60 of the earlier embodiments. Component 72 subtracts Mx from X to determine the 1 bpp sign of Cx, Scx. Scx is concatenated with Mx in a concatenator operator (i.e., a bit extractor/combiner) 73 to form a composite (unsigned) 12 bpp address Mx, by which to address LUTs 74 and 76.

Since Mx represents the mean of the low frequency component of the image data, it is reasonable to drop the least significant bit of Mx from the LUT address in order to reduce LUT size, which reduces memory requirements. The present embodiment illustrates only a reduction by 1 bit, which reduction has no perceivable impact on the computation fidelity of the results. However, experimentation has shown that several least significant bits ("lsb's") of Mx may be dropped from the LUT address before quantization errors become readily visible; hence, the illustration of a signal bit reduction is not limiting.

The respective computations performed in LUTs 74 and 76 are the same as those performed in LUTs 51 and 53, respectively, of FIG. 5, with Fc now addressed by Scx and Mx.

LUT 74 computes:

$$1/M_x * F_c(S_{cx}, M_x) * F_m(M_x) \quad (15)$$

LUT 76 computes:

$$F_m(M_x) * (1 - F_c(S_{cx}, M_x)) \quad (16)$$

As with multiplier 52 in FIG. 5, multiplier 78 of FIG. 7 outputs the multiplication product of X and the output of LUT 74. The output of LUT 74 has a fractional component and is implicitly fixed point. The BIT EXTRACTOR 77 extracts the integer portion of the output result of multiplier 75 and discards the fractional component. The ADD 78 performs an addition of the outputs of LUT 76 and bit extractor 77 and produces the final result Y. LUT 79 clips the output of LUT 78 to ensure an 8 bit result (i.e., computationally, the output of LUT 78 may be greater than 255 and thus is clipped by LUT 79 to ensure the 8 bit result).

FIG. 8, the sixth embodiment of the invention, represents an alternative realization to that of FIG. 7, relative to the fourth embodiment of FIG. 6. The relationship of FIG. 8 to FIG. 6 parallels that of FIG. 4 to FIG. 3. FIG. 8 requires less memory for LUTs than FIG. 7 due to the reduced size of LUT 86 relative to LUT 76. This reduction in LUT size comes at the cost of the additional signed multiply function 88 in FIG. 8. Elements 84–89 of FIG. 8 correspond to elements 74–79 of FIG. 7, respectively, subject to the above differentiation between these embodiments in that FIG. 8 uses less cache but is slightly more computationally intensive since processing the extra sign bit, as will be appreciated by a comparison of the "signed" designations in FIG. 8 compared to the "unsigned" designations in FIG. 7. FIG. 8, moreover, has a combiner 81 for combining the sign bit $S_{CX}$ with the unsigned 11 bpp output of cathenator 83. Further, in FIG. 8:

$$\text{LUT 84 performs: } 1/M_X F_C(S_{CX}, M_X) F_M(M_X) \quad (17)$$

$$\text{LUT 86 performs: } F_M(M_X) \quad (18)$$

Figure 9:
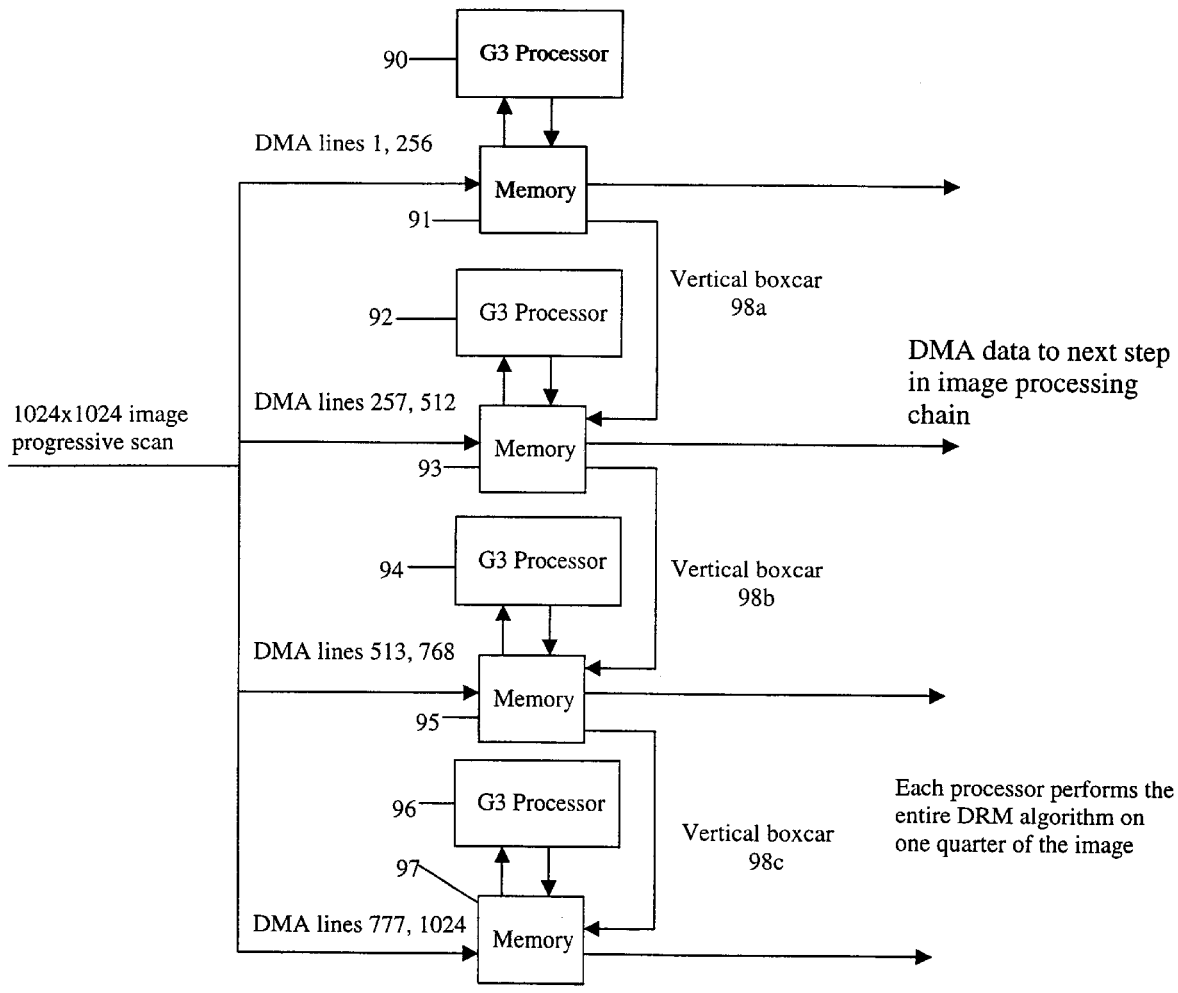
FIG. 9 is a block diagram of an alternative, parallel processing system, relative to FIG. 2, implementing and performing a C-DRM algorithm in accordance with the invention and including any of the first through sixth embodiments of FIGS. 3 through 8, respectively.

The functions in accordance with FIG. 7 were performed in a multiprocessor system, as shown in FIG. 9 employing, by way of example and not limitation, Mercury hardware using four (4) Motorola PowerPC G3 processors 90, 92, 94, and 96 in parallel as the computational device with Mercury Raceway as data flow communication device. Image data from the detector 15 in a matrix of 1024×1024 pixels, 12 bpp, is progressively scanned in four (4) equal amounts, indicated in FIG. 9 by Direct Memory Addressing (DMS) of lines 1–256 to memory 9, DMA lines 257–512 into memory 93, DMA lines 513–778 into memory 95, and DMA lines 777–1024 into memory 97. This addressing format enables processing of data in parallel by the respective processors 90, 92, 94 and 96 in accordance with the C-DRM algorithm, as hereinabove explained, (i.e., FIGS. 3 to 8). Processor assembler software and Mercury MCOS software is utilized to instruct the hardware devices to perform data communications in coordination with appropriate control signals and CDRM computation on the data in coordination with data availability. The BOXCAR function (illustrated as items 12, 30, 40, 50, 60, 70, and 80 in FIGS. 1 and 3–8 respectively) is decomposed to two serial one dimensional averages, vertical followed by horizontal. Since the image is partitioned by lines among the four processors 90, 92, 94, 96, the vertical boxcar inputs are shared among the neighboring processors on the vertical boundaries 98a, 98b and 98c. Due to the moving average computation of the vertical boxcar, the result must be propagated from 90 to 92 to 94, and finally to 96 with the final result passed back up, in each instance, as shown by the double-headed arrows on the vertical boundaries 98a, 98b and 98c. As an alternative embodiment to the use of the aforesaid vertical boundaries, a corresponding replication of boundary lines in the data transfer input to each of the memories 91, 93, 95 and 97 may be employed, consistent with the moving average BOXCAR function of the processors. Once the CDRM computation has been completed, the image result remains partitioned in 91, 93, 95, and 97 and is propagated from the four memories to a next image processing stage or to display.

During feasibility clinical trials of implementations, and performances, of the prior art EDR FIG. 1 algorithm, several observations were made regarding perceived needs for improvement in aspects of the use and performance which have been addressed in the C-DRM in accordance with the invention. As one factor, it had been contemplated that a technician would tune the C-DRM to the dynamic range of the imagery during a cardiac x-ray acquisition; this, however, was considered a distraction by the clinician and was therefore avoided. As a result, EDR "high" was always selected, which assumed a maximum intensity dynamic range of the system (e.g. 15*ABD value in the feasibility clinical trials). However, the true dynamic range of the imagery could be significantly less. When the dynamic range of the imagery was significantly less than 15*ABD, EDR compressed the data to a subset of the 255 values available. This resulted in imagery of sub-optimal image quality in terms of brightness, contrast, and visually perceivable bit starvation. Offline tuning of EDR demonstrated that the impact was readily perceivable, thus leading to an interest in having the C-DRM mean and contrast modification functions automatically adapt to the dynamic range actually present in the input imagery rather than assume the maximum range numerically possible.

Figure 10:
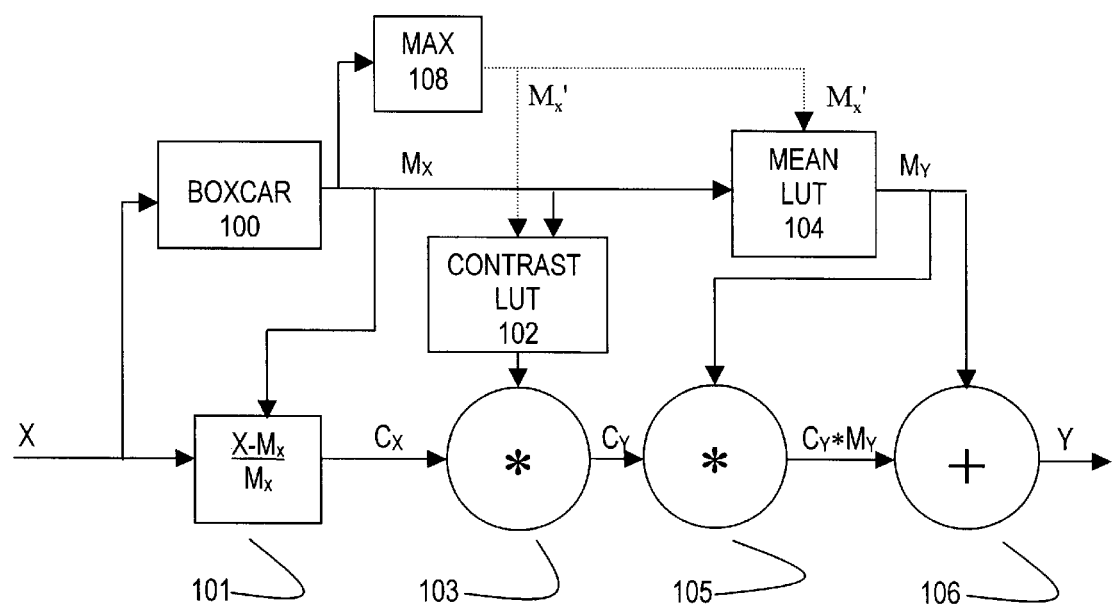
FIG. 10 is a flow diagram of a seventh embodiment of the invention, comprising an apparatus automatically adapting the C-DRM algorithm to a variable input dynamic range of the input image data, which is usable in any of the foregoing embodiments of FIGS. 3 through 8 and may be realized in the hardware architecture presented in FIG. 9.

As background relevant to a discussion of the embodiment of FIG. 10, the intensity dynamic range of cardiac X-ray images varies significantly, depending on field of view, gantry (tube/imager) angulation relative to the patient, and lung content in the image. As is common knowledge, if an objective is to compress an input dynamic range of [0, 600] to a display range of [0, 255] employing a compression algorithm and if, instead, one assumes erroneously an input dynamic range of [0, 4000], the compression algorithm will produce a suboptimical result. Such a hypothetical, or exaggerated, value of the input dynamic range actually can exist, or be interpreted as existing, in an input image by virtue of anomalies or defects, e.g., as produced by erroneous bright pixels caused by imager defects.

To overcome those problems and, in accordance with the embodiment of the invention shown in FIG. 10, the C-DRM algorithm automatically adapts to the intensity dynamic range of the image, affording a significantly broader dynamic range management enabling one to take full advantage of the actual dynamic range of the imagery than typically is accomplished than when manual adjustments are made, e.g., by a technician, for tuning the C-DRM "strength" during a cardiac x-ray acquisition. Automatic adaptation likewise avoids possible distraction of the clinician; likewise, it avoids the undesired results, where manual tuning is not done correctly, of a reduced dynamic range of the imagery and sub-optimal image quality in terms of brightness, contrast and bit starvation. Such automatic adaptation, moreover, should be of low latency (at rates of frames, not seconds) and must be smooth, so the imagery does not abruptly flicker during the adaptation. This feature is referred to hereinafter as the "MAX" function, in that the C-DRM algorithm adapts to a temporally low pass filtered maximum value of $M_X$, as a measure of the image's intensity dynamic range. The MAX feature thus measures the dynamic range of the input image and then tunes the compression algorithm accordingly.

Particularly, the MAX measurement is spatially low pass filtered (output of BOXCAR 100) thereby to suppress erroneous bright pixels, such as imager defects, in the load mean estimate Mx. Mx is then temporally filtered in MAX 108 (e.g., a one dimensional BOXCAR or an infinite impulse response filter) to provide dynamic range continuity in the output Mx', thereby suppressing rapid changes in the dynamic range of the imagery and, e.g., suppressing flicker in the displayed image when the clinician is panning.

As shown in FIG. 10, the BOXCAR function 100 calculates the local mean estimate $M_X$ value in the manner discussed in relation to FIG. 3. The local mean estimate $M_X$ is then further processed by MAX function 108 to determine a maximum $M_X'$ of the local mean estimate $M_X$, which is then supplied to each of the contrast LUT function 102 and the Mean LUT function 104, each corresponding to a particular sub-range of the total dynamic range. This function basically determines the dynamic range over the whole image; that information then is output as $M_X'$ and used in LUT addressing. The object of $M_X'$ is to impose only the amount of compression necessary—e.g., some small amount of compression of flat imagery and substantial compression of dynamic imagery, thereby increasing the performance. (Without the MAX function, a common amount of compression is applied to all imagery, regardless of the dynamic range actually present.) $M_X'$ accordingly selects a LUT from a set of LUTs, and the selected LUT is then indexed by the usual Mx.

For example, assume that the maximum intensity dynamic range of a pixel of an image, prior to compression, is from 0 to 1500. Each of the lookup tables in the Contrast LUT 102 and in Mean LUT 1044 will correspond to a respective sub-range of the total dynamic range. In one practical device, contrast LUT 22 and mean LUT 24 each comprises 16 lookup tables which together cover the total dynamic range (i.e., the total dynamic range preferably is divided into 16 sub-ranges) Mx_prime ($M_X'$) is an additional input to the LUTs. However, the invention is not limited with respect to the number of lookup tables utilized by the Contrast LUT 22 and in Mean LUT 24.

The local mean estimate M'x is supplied to the contrast LUT function 102, which processes Mx and Mx' by the contrast function FC(Mx, Mx') and outputs to multiplier 103. Mx' is also input to the mean LUT function 104, which outputs Fm(Mx, Mx'), the adaptively modified local mean MY', to multiplier 105 and ADD 106. Multiplier 105 performs the function of equation (4) to output the adaptively modified product Cy'*MY', which ADD function 106 combines with MY' in accordance with equation (2) to produce the adaptive C-DRM output intensity Y'.

The contrast and mean values of the look-up tables, 102 and 104 respectively of FIG. 10, are similar to those of LUTs 32 and 34 in FIG. 3, the first embodiment of the invention, the difference being that LUTs 102 and 104 are addressed by Mx and Mx' thereby further adapting their respective outputs to the dynamic range present in X as measured by 108, i.e., Mx'. If the dynamic range is relatively large (i.e., portions of the image are very bright while others are very dark), the look-up indexed in the Mean Modification LUT function 104, Fm(Mx, Mx'), results in a relatively large compression of the local mean intensity value and, similarly, the Contrast Modification LUT 102, Fc(Mx, Mx'), strongly compresses contrast in the brights to avoid excessive clipping. Conversely, if the dynamic range is relatively small (i.e., the image is relatively dark), the look-up table indexed in the Mean Modification Function 104 causes modest change to the means and the Contrast Modification LUT function 102 better preserves a maximum contrast in the upper portion of the dynamic range input signal.

It will be understood by those skilled in the art the MAX adaptation invention in FIG. 10 can readily be applied to the C-DRM embodiments represented in FIGS. 3–8 having equivalent performance benefit at the cost of more memory to store the larger LUTs now additionally addressed by Mx'.

While the invention has been disclosed hereinabove in the environment of a digital signal processing system, it is equally applicable to an analog system, such as the LC+ Cardiac X-ray product produced by the General Electric Company and which implements the EDR algorithm discussed hereinabove. In such an analog adaptation and with reference to FIG. 4, the input intensity X represents (i.e., rather than a pixel, as in the digital system described hereinabove) the analog voltage waveform for a line of data, successive units X representing respective, successive lines of data separated by horizontal synchronization signals. In the analog implementation, BOXCAR 40 may comprise a simple one dimensional low pass filter. ADD 41 outputs the difference waveform, X–Mx, by inverting Mx and summing the waveforms. Mx is applied to LUT 42, and the resultant output thereof modulates the X–$M_X$ signal in multiplier 43 to produce an output comprising an analog waveform $C_y * M_y$, corresponding to one line of the image. LUT 44 represent analog circuitry performing the mean modification function $F_m()$ on Mx, resulting in $M_Y$. ADD 45 sums the analog output waveforms of 43 and 44, resulting in the output analog waveform Y, representing an analog waveform of the reduced intensity range and corresponding to the input analog waveform for a line of data of the image.

It will be understood by those skilled in the art that the invention has been described with reference to the preferred embodiments, but that the invention is not limited to these embodiments. Those skilled in the art will understand that modifications can be made to the embodiments discussed above which are within the scope of the invention.

What is claimed is:

1. A method of compressing an intensity dynamic range of an input image to a reduced intensity dynamic range of an image display signal, comprising:

a) defining plural units of each frame of the input image, each input image unit having a corresponding intensity;

b) determining a local mean estimate of the intensity of each of the plural units of the input image;

c) processing each local mean estimate, separately and directly, in accordance with:

i) a mean modification function to produce a corresponding mean modification processing result, and ii) a contrast function, comprising a contrast modification function, to produce a corresponding contrast modification processing result, wherein the contrast function further multiplies an output of the contrast modification function by a contrast estimate to produce the contrast modification processing result; and d) combining the corresponding mean modification function result and contrast modification function result to produce, for each input image unit intensity, a respective output intensity, within the reduced intensity range, for a corresponding unit of the image display signal.

2. A method as recited in claim 1, wherein:

each input image unit corresponds to a pixel of the input image as detected by a digital detector.

3. A method as recited in claim 1, wherein:

each input image unit corresponds to a scan line of an analog image detector.

4. A method as recited in claim 1, wherein:

the processing of each input image unit intensity, separately and directly, further comprises multiplying the output of the contrast modification function by the mean modification function result and producing the multiplication product as a first combined, corresponding mean modification and contrast modification processing result; and the combining step further comprises combining the combined, corresponding mean modification function processing result and contrast modification function processing result with the mean modification processing result to produce, for each input image unit intensity, the respective output intensity, within the reduced intensity range, for the corresponding unit of the image display signal.

5. A method as recited in claim 1, wherein the processing of each input image unit intensity, separately and directly, further comprises:

multiplying the mean modification function result by a negative complement of the contrast modification function and producing the multiplication product as a first combined, and corresponding, mean modification function and contrast modification function processing result; and multiplying the contrast modification function by the mean modification function by an inverse of the local mean estimate and by the input image unit intensity and producing the multiplication product as a second combined, and corresponding, mean modification function and contrast modification function processing result; and the combining step further comprises combining the first and second combined, and corresponding, mean modification function and contrast modification function processing results to produce, for each input image unit intensity, a respective output intensity, within the reduced intensity range, for the corresponding unit of the image display signal.

6. A method as recited in claim 1, further comprising:

determining a contrast estimate as a function of a ratio, of a difference between the intensity of a unit of the input image and the local mean estimate thereof to the local mean estimate;

determining a sign of the contrast estimate; and controlling the processing of each local mean estimate by the contrast modification function by employing the sign of the contrast estimate to manage positive and negative contrasts separately.

7. A method as recited in claim 1, further comprising:

processing the local mean estimate by temporally filtering same and producing a resultant, modified local mean estimate having enhanced dynamic range continuity, substantially independent of rapid changes in the dynamic intensity range of the input image; and controlling the processing of each local mean estimate, including the processing thereof by the mean and contrast modification functions, in accordance with the modified local mean estimate.

8. A method as recited in claim 7, further comprising:

processing each local mean estimate and the mean and contrast modification function processing results and the output intensity corresponding to each unit of the input image, as respective, multiple bit values; and limiting the number of bits of the output intensity of the corresponding unit of the image display signal to a predetermined number of bits, consistent with display range capabilities of an available display device.

9. A method as recited in claim 8, further comprising:

performing the processing of each local mean estimate in accordance with the mean and contrast modification functions and the multiplication of the modification results of same for producing multiplication products, in accordance with accessing respective look-up tables from which are produced the corresponding multiplication products and wherein each of the local mean estimate, the mean modification function and the contrast modification function processing results and the respective multiplication products thereof constitute respective, multiple bit values.

10. A method as recited in claim 9, further comprising:

determining a sign value of the contrast estimate, as a respective, single bit value for each local mean estimate; and combining the sign of a contrast estimate with the local mean estimate for accessing each of the look-up tables.

11. A method as recited in claim 9, further comprising:

determining a sign of the contrast estimate, as a respective, single bit value for each local mean estimate;

forming the local mean estimate as an unsigned number of bits;

combining the sign of the contrast estimate with the unsigned number of bits representing the local mean estimate for accessing a first look-up table performing the contrast modification function; and accessing a second look-up table performing the mean modification function using the unsigned number of bits representing the local mean estimate.

12. An apparatus compressing an intensity dynamic range of an input image to a reduced intensity dynamic range of an image display signal, each frame of the input image comprising plural units, the apparatus comprising:

a filter determining a local mean estimate of the intensity of each of the plural units of the input image;

a computer processing each local mean estimate, separately and directly, in accordance with;

a mean modification function to produce a corresponding mean modification processing result, and a contrast function, comprising a contrast modification function, to produce a corresponding contrast modification processing result; and the computer further comprising multiplying an output of the contrast modification function by a contrast estimate to produce the contrast modification processing result; and the computer combining the corresponding mean modification function and contrast modification procession function results to produce, for each input image unit intensity, a respective output intensity, within the reduced intensity range, for a corresponding unit of the image display signal.

13. An apparatus as recited in claim 12, further comprising:
a digital image detector, each input image unit corresponding to a pixel of the input image as detected by the digital detector.

14. An apparatus as recited in claim 12, further comprising:
an analog image detector, each input image unit corresponding to a scan line of the input image as detected by the analog image detector.

15. An apparatus as recited in claim 12, wherein the processing of each, separately and directly, by the computer further comprises:
multiplying the output of the contrast modification function by the mean modification function result and producing the multiplication product as a first combined, corresponding mean modification and contrast modification processing result; and
combining the combined, corresponding mean modification function processing result and contrast modification function processing result with the mean modification processing result to produce, for each input image unit intensity, the respective output intensity, within the reduced intensity range, for the corresponding unit of the image display signal.

16. An apparatus as recited in claim 12, wherein the processing of each input image unit intensity, separately and directly, by the computer further comprises:
multiplying the mean modification function result by a negative complement of the contrast modification function and producing the multiplication product as a first combined, and corresponding, mean modification function and contrast modification function processing result;
multiplying the contrast modification function by the mean modification function and by an inverse of the local mean estimate and by the input image unit intensity and producing the multiplication product as a second combined, and corresponding, mean modification function and contrast modification function processing result; and
combining the first and second combined, and corresponding, mean modification function and contrast modification function processing results to produce, for each input image unit, a respective output intensity, within the reduced intensity range, for the corresponding unit of the image display signal.

17. An apparatus as recited in claim 12, wherein the processing by the computer further comprises:
determining a contrast estimate as a function of a ratio, of a difference between the intensity of a unit of the input image and the local mean estimate thereof to the local mean estimate;
determining a sign of the contrast estimate; and
controlling the processing of each local mean estimate by the contrast modification function by employing the sign of the contrast estimate to manage positive and negative contrasts separately.

18. An apparatus as recited in claim 12, wherein the processing by the computer further comprises:
processing the local mean estimate by temporally filtering same and producing a resultant, modified local mean estimate having enhanced dynamic range continuity, substantially independent of rapid changes in the dynamic intensity range of the input image; and
controlling the processing of each local mean estimate, including the processing thereof by the mean and contrast modification functions, in accordance with the modified local mean estimate.

19. An apparatus as recited in claim 18, wherein the processing by the computer further comprises:
processing each local mean estimate and the mean and contrast modification function processing results and the output intensity corresponding to each unit of the input image, as respective, multiple bit values; and
limiting the number of bits of the output intensity of the corresponding unit of the image display signal to a predetermined number of bits, consistent with display range capabilities of an available display device.

20. An apparatus as recited in claim 19, wherein the processing by the computer further comprises:
performing the processing of each local mean estimate in accordance with the mean and contrast modification functions and the multiplication of the modification results of same for producing multiplication products, in accordance with accessing respective look-up tables from which are produced the corresponding multiplication products and wherein each of the local mean estimate, the mean modification function and the contrast modification function processing results and the respective multiplication products thereof constitute respective, multiple bit values.

21. An apparatus as recited in claim 20, where the processing by the computer further comprises:
determining a sign value of the contrast estimate, as a respective, single bit value for each local mean estimate; and
combining the sign of a contrast estimate with the local mean estimate for accessing each of the look-up tables.

22. An apparatus as recited in claim 20, where the processing by the computer further comprises:
determining a sign of the contrast estimate, as a respective, single bit value for each local mean estimate;
forming the local mean estimate as an unsigned number of bits;
combining the sign of the contrast estimate with the unsigned number of bits representing the local mean estimate for accessing a first look-up table performing the contrast modification function; and
accessing a second look-up table performing the mean modification function using the unsigned number of bits representing the local mean estimate.

23. A method of compressing an intensity dynamic range of an input image to a reduced intensity dynamic range of an image display signal, comprising:
a) defining plural units of each frame of the input image, each input image unit having a corresponding intensity;
b) determining a local mean estimate of the intensity of each of the plural units of the input image;
c) processing each local mean estimate, separately and directly, in accordance with:
$Y = M_Y(1+C_Y)$, where:
$M_Y = F_M(M_X)$,
$C_Y = F_C(M_X) * C_X$, and
$X_C = (X - M_X)/M_X$
$X$ = input intensity
$M_X$ = local mean estimate $C_X$=contrast estimate
$F_M(\ )$=mean modification function
$F_C(\ )$=contrast modification function
Y=C-DRM output intensity
$M_Y$=modified local mean
$C_Y$=modified contrast; and d) combining the corresponding mean modification function result and contrast modification function result to produce, for each input image unit intensity, a respective output intensity, within the reduced intensity range, for a corresponding unit of the image display signal.

24. A method as recited in claim 23, wherein:
the mean modification function achieves either a linear or a non-linear transformation of the mean component of the image; and
the contrast modification function applies a linear gain to the input contrast to the construct the output contrast.

25. A method as recited in claim 23, in which the input intensity value (X) of an input pixel is processed by a moving average function to produce the local mean estimate ($M_x$).

26. A method as recited in claim 23, wherein first and second look-up tables respectively perform the contrast modification function and the mean modification function respectively of the equations for determining $C_Y$ and $C_X$.

27. A method as recited in claim 23, wherein the mean modification function transforms the mean from being linearly related to X-ray counts to being linearly related to an equivalent water thickness represented by the X-ray counts.

28. A method as recited in claim 23, wherein the contrast modification function $C_Y$ is implemented in compliance with a requirement that $F_C$ is monotonically increased in accordance with:

$$F_C(C+1, Mx) \geq F_C(C, Mx) \forall C, Mx.$$

29. A method as recited in claim 23, further comprising:
processing of the equations for determining Y, $M_Y$, $C_Y$ and $C_X$ to produce the output intensity (Y) in accordance with:

$Y = CyMy + My$, where:

$Cy = fcCx$ and $fc(Mx) = fc$ $Y = fcCxMy + My$, where:

$cx = \dfrac{x - Mx}{Mx}$ $Y = fc(x - Mx)(My/Mx) + My$ $Y = X\dfrac{fcMy}{Mx}\left[x - Mx\left(1 - \dfrac{1}{fc}\right)\right]$ $Y = X\left(\dfrac{fxMy}{Mx}\right) - Mx\left(\dfrac{fcMy}{Mx}\right)\left(1 - \dfrac{1}{fc}\right)$ $My = fm(Mx) = fm$ $Y = X\left(\dfrac{fcfm}{Mx}\right) - Mx\left(\dfrac{fcfm}{My}\right)\left(1 - \dfrac{1}{fc}\right)$ $Y = X\left(\dfrac{fcfm}{Mx}\right) - Mx\left(\dfrac{fcfm}{My} - \dfrac{fcfm}{fcMx}\right)$ $Y = X\left(\dfrac{fcfm}{Mx}\right) - Fm(fc - 1)$ $Y = X\left(\dfrac{fcfm}{Mx}\right) + fm(1 - fc)$ the contrast modification function processing is performed in a first look-up table which computes:

$1/Mx * Fc(Scx, Mx) * Fm(Mx)$ the mean modification function processing is performed in a second look-up table which computes:

$Fm(Mx) * (1 - Fc(Scx, Mx))$; and the output of the first look-up table is multiplied by the input intensity (X) and the resulting product is added to the output of the second look-up table to produce an output sum; and
the output sum is processed by a third look-up table to clip the output to a desired number of bits.

30. A method as recited in claim 29, wherein the desired number of bits is eight bits.

31. A method as recited in claim 23 further comprising processing the equations for determining Y, $M_Y$, $C_Y$ and $C_X$ to produce the output intensity (Y) in accordance with:

$Y = CyMy + My$, where:

$Cy = fcCx$ and $fc(Mx) = fc$ $Y = fcCxMy + My$, where:

$Y = CyMy + My$, where:

$Cy = fcCx$ and $fc(Mx) = fc$ $Y = fcCxMy + My$, where:

$cx = \dfrac{x - Mx}{Mx}$ $Y = fc(x - Mx)(My/Mx) + My$ $Y = X\dfrac{fcMy}{Mx}\left[x - Mx\left(1 - \dfrac{1}{fc}\right)\right]$ $Y = X\left(\dfrac{fxMy}{Mx}\right) - Mx\left(\dfrac{fcMy}{Mx}\right)\left(1 - \dfrac{1}{fc}\right)$ $My = fm(Mx) = fm$ $Y = X\left(\dfrac{fcfm}{Mx}\right) - Mx\left(\dfrac{fcfm}{My}\right)\left(1 - \dfrac{1}{fc}\right)$ $Y = X\left(\dfrac{fcfm}{Mx}\right) - Mx\left(\dfrac{fcfm}{My} - \dfrac{fcfm}{fcMx}\right)$ $Y = X\left(\dfrac{fcfm}{Mx}\right) - Fm(fc - 1)$ $Y = X\left(\dfrac{fcfm}{Mx}\right) + fm(1 - fc)$ the contrast modification function processing is performed in a first look-up table which computes:

$1/Mx * Fc(Scx, Mx) * Fm(Mx)$ the mean modification function processing is performed in a second look-up table which computes:

$Fm(Mx) * (1 - Fc(Scx, Mx))$; and the output of the first look-up table is multiplied by the input intensity (X) and the resulting product is added to the output of the second look-up table to produce an output sum; and the output sum is processed by a third look-up table to clip the output to a desired number of bits.

32. A method as recited in claim 31, wherein the desired number of bits is eight bits.

33. An apparatus compressing an intensity dynamic range of an input image to a reduced intensity dynamic range of an image display signal, each frame of the input image comprising plural units, the apparatus comprising:

a filter determining a local mean estimate of the intensity of each of the plural units of the input image;

a computer processing each local mean estimate, separately and directly, in accordance with:
$Y=M_Y(1+C_Y)$, where:
$M_Y=F_M(M_X)$,
$C_Y=F_C(M_X)*C_X$, and
$C_X=(X-M_X)/M_X$
X=input intensity
$M_X$=local mean estimate
$C_X$=contrast estimate
$F_M(\ )$=mean modification function
$F_C(\ )$=contrast modification function
Y=C-DRM output intensity
$M_Y$=modified local mean
$C_Y$=modified contrast; and the computer combining the corresponding mean modification function result and contrast modification function result to produce, for each input image unit intensity, a respective output intensity, within the reduced intensity range, for a corresponding unit of the image display signal.

34. An apparatus as recited in claim 33, wherein:

the mean modification function achieves either a linear or a non-linear transformation of the mean component of the image; and the contrast modification function applies a linear gain to the input contrast to the construct the output contrast.

35. An apparatus as recited in claim 33, in which the input intensity value (X) of an input pixel is processed by a moving average function to produce the local mean estimate ($M_X$).

36. An apparatus as recited in claim 33, wherein first and second look-up tables respectively perform the contrast modification function and the mean modification function respectively of the equations for determining $C_Y$ and $C_X$.

37. An apparatus as recited in claim 33, wherein the mean modification function transforms the mean from being linearly related to X-ray counts to being linearly related to an equivalent water thickness represented by the X-ray counts.

38. An apparatus as recited in claim 33, wherein the contrast modification function $C_Y$ is implemented in compliance with a requirement that $F_C$ is monotonically increased in accordance with:

$$F_C(C+1, Mx) \geq F_C(C, Mx) \forall C, Mx.$$

* * * * *